United States Patent [19]

Marrandi et al.

[11] Patent Number: 4,938,295
[45] Date of Patent: Jul. 3, 1990

[54] IMPLEMENT HITCH ASSEMBLY

[76] Inventors: Tiit R. Marrandi, derevnya Moka, Estonskaya SSR, Raplasky raion; Juri R. Olt, sovkhoz-tekhnikum Kuremaa, Estonskaya SSR, Iygevasky raion, both of U.S.S.R.

[21] Appl. No.: 288,234

[22] Filed: Dec. 22, 1988

[51] Int. Cl.⁵ .............................................. A01B 73/00
[52] U.S. Cl. .................................... 172/313; 172/386; 280/412
[58] Field of Search ............... 172/310, 311, 313, 314, 172/324, 325, 456, 383, 386; 280/411.1, 412

[56] References Cited

U.S. PATENT DOCUMENTS

| | | | |
|---|---|---|---|
| 3,112,124 | 11/1963 | Bartel | 280/412 |
| 3,292,948 | 12/1966 | McMasters et al. | 172/311 X |
| 3,324,956 | 6/1967 | Ritchie | 172/386 |
| 4,154,451 | 5/1979 | Young | 172/311 X |
| 4,274,492 | 6/1981 | Peterson | 172/311 X |
| 4,368,806 | 1/1983 | Raineri | 172/386 X |
| 4,396,069 | 8/1983 | Ferber et al. | 172/310 |

FOREIGN PATENT DOCUMENTS

| | | | |
|---|---|---|---|
| 1069644 | 1/1984 | U.S.S.R. | 172/383 |
| 1250180 | 8/1986 | U.S.S.R. | |

*Primary Examiner*—Randolph A. Reese
*Assistant Examiner*—Jeffrey L. Thompson
*Attorney, Agent, or Firm*—Fleit, Jacobson, Cohn, Price, Holman & Stern

[57] ABSTRACT

An implement hitch assembly serves to aggregate two machines. The machines are echeloned in the working position or in tandem in a transport position when moving from one field to another. The hitch includes a transverse draw bar, connected to a tractor. On the transverse draw bar, provision is made for a pull rod of a front farm machine, which is mounted thereon by a carriage. The hydraulic drive installed on the transverse draw bar is intended for moving the carriage along the transverse draw bar. A lever pivotably connected to the pull rod of the front farm machine carries an arcuate beam coupled therewith at the front end thereof by a pivot. The rear end of the arcuate beam rests on a support wheel with a suspension. On the vertical axis of the suspension there is mounted a clevis of a rear farm machine. The hydraulic drive connected with the pull rod of the front farm machine moves the latter along as it transfers both machines to one of the positions hereinabove identified. In the transport position, the arcuate beam of the implement is disposed above the front farm machine, i.e., vertically, while it is in a horizontal position in the working position of the implement. Upon transfer, an operator does not leave the tractor cabin.

7 Claims, 3 Drawing Sheets

IMPLEMENT HITCH ASSEMBLY

FIELD OF THE INVENTION

This invention relates to agricultural machinery and, more particularly, to hitch arrangements allowing to gang-up a tractor or other power unit with various agricultural machines.

A farm implement hitch assembly, according to the invention, is advantageous when frequent road trips are necessary from one field to another. In the transport position, the machines ganged-up with a tractor are hauled in tandem, that is one after another. The width of the thus hitched machines is equal to the width of one such machine.

The proposed hitch assembly can also be used for ganging up road construction and melioration machines.

BACKGROUND OF THE INVENTION

Known hitch assemblies of similar design are reset to the working or transport position in three manners: by uncoupling the tractor from the hitch assembly and rehitching, manually and automatically. At present, of interest are only mechanized or automated hitch assemblies employing normally hydraulic systems for transferring the implement from the transport to working position and vice versa.

Most of such hitch assemblies include a transverse bar and an arcuate or curved beam connected to a support wheel. Because in the transport position the farm machines are hitched in tandem, the beams curved in the vertical plane make it possible to accommodate the farm machines thereunder. There are known hitch assemblies in which, for coupling farm machines of different spans, use is made of a telescoping brace connecting the curved beams. Position of the hitch beams is locked by the brace. Variations in the angle between the beams is attained by changing the length of the telescoping brace and locking the hitch assembly in a preset position.

It is noted, however, that hitch assemblies with the vertical arrangement of the curved beams are generally very bulky and therefore require much metal for their manufacture. Also, they are of complicated structure.

There are further known implement hitch assemblies in which the arcuate or curved beam assumes a horizontal position when the implement is hauled. One such hitch assembly comprises a U-shaped frame having post ends thereof pivotably connected to longitudinal beams having self-aligning wheels at the ends. The rear self-aligning wheels can be provided with means for locking them in the transport position of the implement.

However, this construction makes use of a large number of support wheels and has a width during transportation exceeding the width of any single machine in the ganged-up implement.

There are known hitch assemblies in which the arcuate beam can assume both horizontal and vertical positions. Such hitch assemblies are free of many disadvantages inherent in the aforedescribed prior art machines.

More specifically, there is known an implement hitch assembly comprising a transverse bar having mounted thereon a mechanism for setting the implement to the transport or working position, and an arcuate beam connected to a support wheel through a suspension having a vertical axis of rotation and fixed relative to the arcuate beam (cf., SU, A, 1,250,180). The mechanism for setting the arcuate beam to the transport or working position has the form of two pivotably interconnected swing arms. A drive mechanism is fashioned as a hydraulic cylinder rigidly affixed to the transverse beam. In order to lock the arcuate beam in the working position and set the rear machine of the implement in the desired position, a telescoping support in the form of a hydraulic cylinder with a catch is rigidly secured on the transverse bar. This implement hitch construction enables to considerably reduce the time required for setting the implement to the working or transport position. Another advantage is the low amount of metal consumed for its fabrication and efficient operation.

However, the support wheel of the arcuate beam is operated manually which is labour consuming and inconvenient.

SUMMARY OF THE INVENTION

It is a major object of the present invention to provide an implement hitch assembly having a modified construction of a support wheel suspension.

Another object is to ensure that the implement is transferred from the transport to working position and vice versa automatically.

One more object is to simplify the construction of the implement hitch assembly.

These and other objects of the invention are attained by that in an implement hitch assembly comprising a transverse draw bar having mounted thereon a mechanism for transferring the implement to transport or working position, and an arcuate beam connected to a support wheel through a suspension having a vertical axis of rotation and locked relative to the arcuate beam, according to the invention, the suspension is locked by a shaft pivotably secured on the arcuate beam and carrying a resilient element and a locking element, and by a lock means positioned on the vertical axis of the suspension by means of a cylindrical pivot having a swing limit, the shaft and lock means being operatively interconnected.

In one preferred embodiment of the invention the locking element has the form of a spline coupling connected to the shaft through the resilient element and to the lock means through a pivot having mutually perpendicular axes. In another embodiment the locking element has the form of a rocker arm pivotably connected to the shaft, and to the lock means through a pivot having mutually perpendicular axes.

Preferably, the resilient element has the form of a compression-tension spring.

The aforedescribed construction of the proposed implement hitch assembly allows transfer of the implement from the transport to working position and vice versa without the operator leaving the cabin of the tractor.

The essence of the invention resides in the following.

The front end of the arcuate beam is connected to the transverse bar by a carriage and two swing arms so that during the travel of this carriage along the transverse bar the arcuate beam is raised to the vertical position or lowered to the horizontal position. At the same time, the rear end of the arcuate beam bears on a self-adjusting support wheel which in the transport position of the implement serves as a wheel for controlling the movement of the rear farm machine. The vertical axis of this support wheel includes two pivotably interconnected portions (axis per se and lock means per se). The pivot connecting these portions has a swing limit ensuring coaxiality of the portions in their extreme position.

Therefore, in the working position of the implement the axes of the pivots and the vertical axis coincide and the support wheel is capable of pivotal movement about a generally vertical axis.

Movement of the upper part of the vertical axis (i.e., the lock means) is attained through that its longitudinal pivot is connected to the arcuate beam by the shaft. The geometry of the shaft is such that in the working position of the implement the lock means assumes a position in line with the vertical axis of the support wheel. The shaft carries the resilient and locking elements. The resilient element has the form of a compression-tension spring ensuring negligeable travel of the shaft relative to the longitudinal pivot enabling the support wheel to follow the surface irregularities of the field both in the working and in the transport positions of the implement. The locking element can be embodied in different fashions. When it has the form of a spline coupling, non-uniform reciprocating motion along the shaft with variable frequency and amplitude is ensured. When the locking element has the form of a rocker arm, the latter ensures angular displacement with respect to the shaft of the lock means. This embodiment seems more reliable and is supposed to show a longer service life. In both embodiments of the locking element its connection with the locking means is effected through a pivot having mutually perpendicular axes. Such a pivot provides the required kinematics of the locking mechanism through enabling the movement of the locking elements to the preset position.

In view of the foregoing, the change in position of parts of the vertical axis of the support wheel is done during shifting the arcuate beam to the vertical position or to the horizontal position taking not more than 0.5 min.

The proposed procedure for change-over of the implement to the transport or working position affords to reduce the amount of metal consumed for manufacturing the implement by 20-25%.

The width of the implement compared to the width of implements having a continuously horizontal position of the arcuate beam is reduced by 1 m.

BRIEF DESCRIPTION OF THE DRAWINGS

The hereinbefore described features and advantages of the present invention will become more fully apparent from a more detailed description of an implement hitch assembly, according to the invention, taken in conjunction with the accompanying drawings, in which.

BEST MODE OF CARRYING OUT THE INVENTION

Described hereinbelow is an implement hitch assembly for two trailed farm machines.

Figure 1:
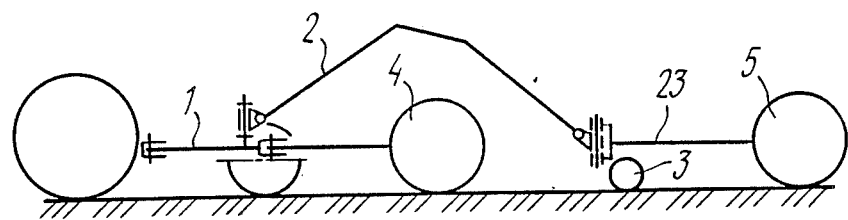
FIG. 1 is a side schematic view of an implement hitch assembly, according to the invention, in the transport position.
Figure 2:
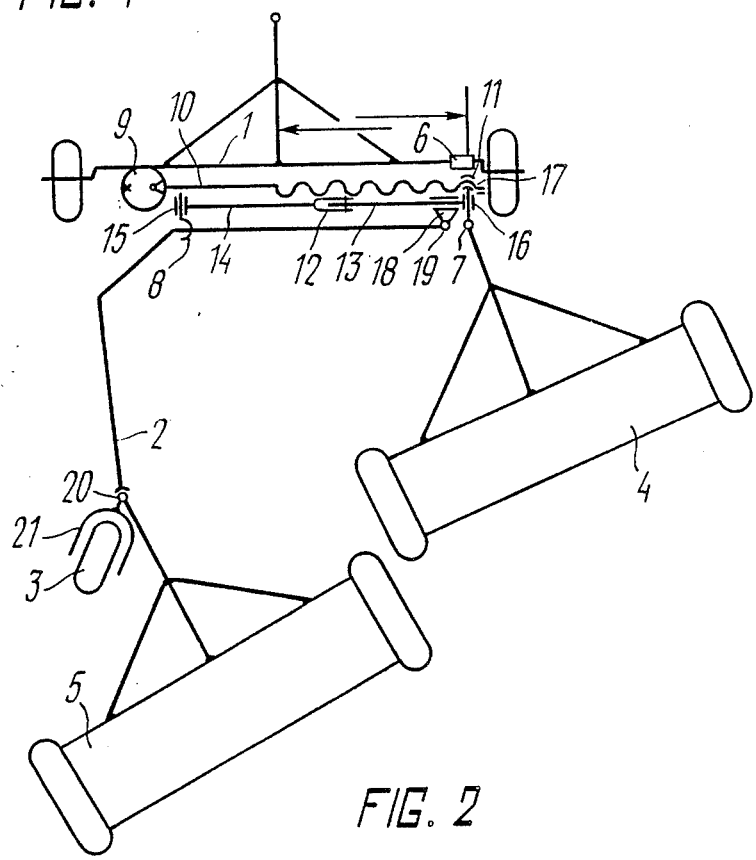
FIG. 2 is a top plan view of the proposed implement hitch assembly in the working position.

The hitch assembly of this farm implement comprises a transverse draw bar 1 (FIG. 1), an arcuate beam 2 with a caster-type support wheel 3, a front trailed machine 4, and a rear trailed machine 5. Provided at the transverse draw bar 1 is a carriage 6 (FIG. 2) to which a two bar 7 of the front trailed machine 4 is rigidly connected, whereas rigidly secured on the transverse draw bar 1 is a support 8 with a catch for locking the arcuate beam 2 in the working position. Also secured on the transverse draw bar 1 is a drive for setting the arcuate beam 2 for operation or transportation. The drive mechanism is of any known suitable design. In this particular instance, use is made of a hydraulic motor 9, a bolt 10 and a nut 11, as well as two levers 13 and 14 articulated through a pivot 12. The hydraulic motor 9 is rigidly affixed to the transverse draw bar 1, whereas the nut 11 is connected to the two bar 7. Free ends of the levers 13 and 14 are connected by cylindrical pivots 15 and 16 on the transverse draw bar 1 and tow bar 7, whereas the free end of the bolt 10 rests by a bearing 17 on the transverse bar 1. In turn, the arcuate beam 2 is connected to the lever 13 by a pivot 18 and by a cylindrical pivot 19.

Figure 3:
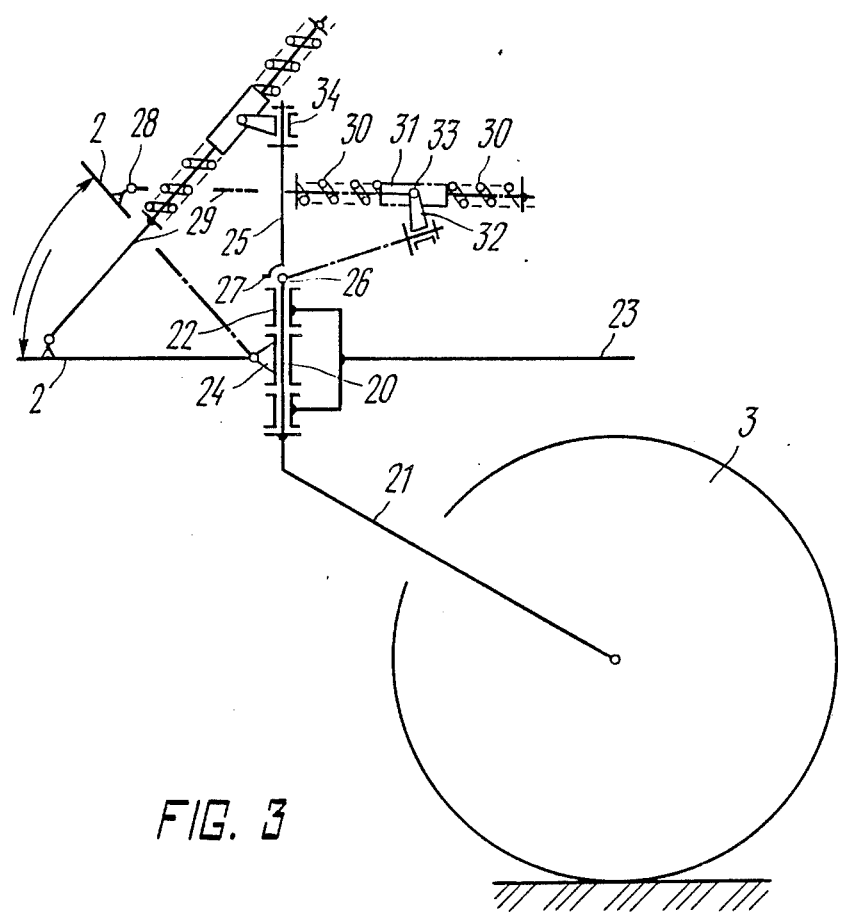
FIG. 3 shows one alternative embodiment of the suspension of a support wheel.
Figure 4:
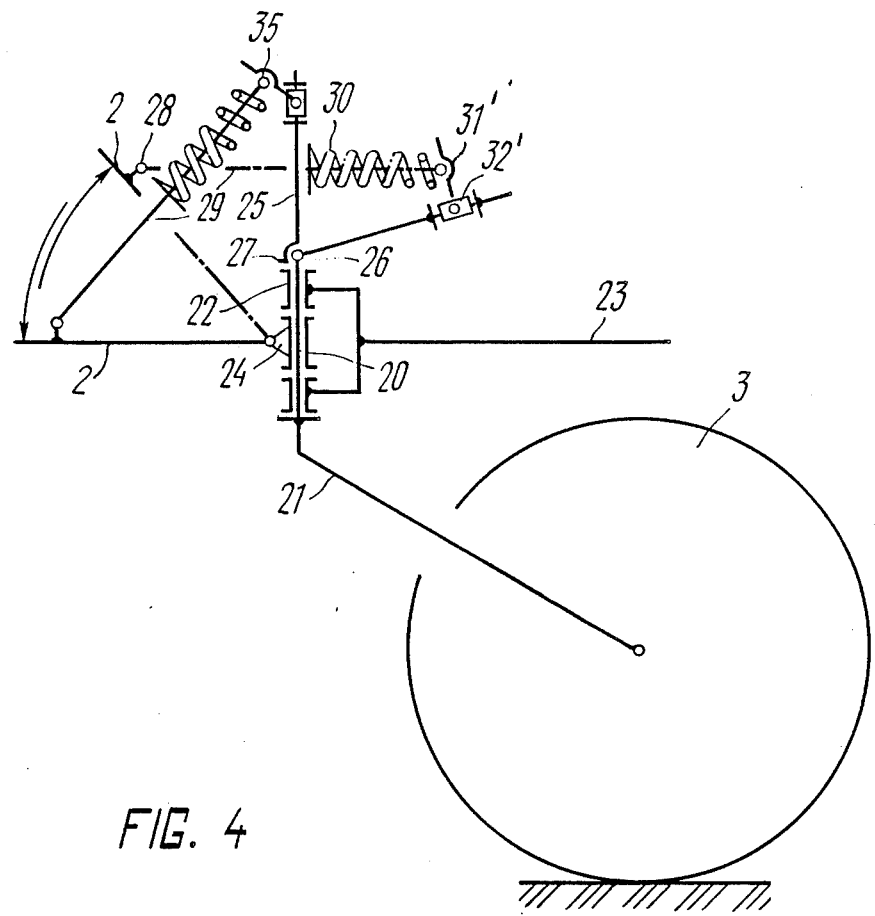
FIG. 4 shows another modification of the suspension of the support wheel.

The arcuate beam 2 is connected to the support wheel 3 through a suspension 21 having a vertical axis 20 of rotation. Mounted on the vertical axis 20 of the suspension 21 by means of a cylindrical pivot 22 (FIGS. 3 and 4) is a clevis bracket 23 of the rear trailed machine 5, and by means of a pivot 24 the arcuate beam 2 is allowed to move - with several degrees of freedom.

For securing the suspension 21 in a definite position with respect to the arcuate beam 2 during transportation, there is provided a lock means 25 connected to the axis 20 by a cylindrical pivot 26 with a swing limit 27, whereas secured at the arcuate beam 2 by means of a pivot 28 is a shaft 29 carrying a resilient element 30 and a locking element 31.

The resilient element 30 can be fashioned as a compression-tension spring. The locking element 31 can be embodied as a spline coupling (FIG. 3) connected to the shaft 29 through the resilient element 30 and to the lock means 25 through a pivot 32 having an axis 33 when the locking means 25 is in the position indicated in dotted lines in FIG. 3 and 34 when the locking means 25 is in the position indicated in solid lines in FIG. 3.

In an alternative modification the locking element 31' has the form of a rocker arm (FIG. 4) connected through a cylindrical pivot 35 to the shaft 29, and to the lock means 25 through the pivot 32'.

The implement is converted to the transport position in the following manner. The hydraulic motor 9 acts to move the carriage 6 with the tow bar 7 by the molt 10 and nut 11 to the center of the implement. The arcuate beam 2 is raised to the vertical position by the levers 13 and 14, whereas the lock means 25 connects the vertical axis 20 of the suspension 21 to the arcuate beam 2 by the pivot 32', locking element 31 and resilient element 30.

The working position is removed by moving the carriage 6 by the hydraulic motor 9, bolt 10 and nut 11. The arcuate beam 2 is lowered by the levers 13 and 14 onto the support 8 where the catch acts to lock it in position. At the same time, the lock means 25 of the suspension 21 is raised by the shaft 29 of the resilient element, locking element 31' and pivot 32' to the vertical position, whereas the support wheel 3 is set to the working position independently.

As the implement is moved forward, the resilient element 30 provides conditions for the smooth travel of the locking element 31' relative to the shaft 29 whereby the implement follows the surface irregularities of the soil.

In view of the aforedescribed, the use of the proposed implement hitch assembly makes it possible to automatically transfer the implement from the transport to the working position and vice versa without the operator leaving the tractor cabin.

Industrial Applicability

This invention is preferable for hitching various farm machines when making frequent moves from one field to another. Transferring the arcuate beam to the vertical or horizontal positions takes not more than 0.5 min.

What is claimed is:

1. An implement hitch assembly comprising:
   a transverse draw bar;
   a mechanism for transferring an implement mounted on said draw bar from a transport position to a working position or from the working position to the transport position;
   an arcuate beam mounted on said draw bar;
   a support wheel with a suspension pivotably secured on said arcuate beam and having a vertical axis of rotation, said support wheel being lockable relative to said arcuate beam;
   a shaft for locking said suspension pivotably secured on said arcuate beam;
   a resilient element and a locking element mounted on said shaft;
   lock means positioned on said suspension, said lock means including a cylindrical pivot having a swing limit for automatically locking said suspension against pivotal movement as said arcuate beam is positioned in its working position;
   said shaft and said lock means being operatively interconnected.

2. An assembly as defined in claim 1, wherein the locking element is a spline coupling connected to the shaft through the resilient element, and to the lock means through a pivot having mutually perpendicular axes.

3. An assembly as defined in claim 1, wherein the locking element is a rocker arm pivotably connected to the shaft, and connected to the lock means through a pivot having mutually perpendicular axes.

4. An assembly as defined in claim 1, wherein the resilient element is a compression-tension spring.

5. An implement hitch assembly comprising:
   a transverse draw bar;
   a pull rod of a front farm machine pivotably connected with said transverse draw bar,
   a hydraulic drive installed on said transverse draw bar to move said pull rod of the front farm machine transversely along said draw bar,
   a lever pivotably connected with said hydraulic drive,
   an arcuate beam mounted with a front end thereof on said lever by means of a pivot having mutually perpendicular axes of rotation,
   a rearward tip of the arcuate beam being coupled with a support wheel in an articulated connection,
   lock means positioned on said suspension, said lock means including a cylindrical pivot having a swing limit for automatically locking said suspension against rotation relative to said arcuate beam as said arcuate beam is positioned in its working position, and
   said support wheel suspension by a pivot with mutually perpendicular axes of rotation, and
   a clevis bracket of a rear farm machine mounted with a cylindrical pivot on said vertical axis of the suspension.

6. A hitch assembly as defined in claim 5, wherein the hydraulic drive includes a hydraulic motor, a screw and a nut.

7. A hitch assembly as defined in claim 5, wherein said pull rod of the front farm machine is connected via a carriage with the transverse draw bar.

* * * * *